US005503658A

United States Patent [19]
Zarchy et al.

[11] Patent Number: 5,503,658
[45] Date of Patent: Apr. 2, 1996

[54] PROCESS FOR THE REMOVAL OF VOLATILE ORGANIC COMPOUNDS FROM A FLUID STREAM

[75] Inventors: Andrew S. Zarchy, Amawalk; Kirit M. Patel, Hopewell Junction, both of N.Y.

[73] Assignee: UOP, Des Plaines, Ill.

[21] Appl. No.: 324,041

[22] Filed: Oct. 17, 1994

Related U.S. Application Data

[63] Continuation-in-part of Ser. No. 151,244, Nov. 12, 1993, Pat. No. 5,415,682.

[51] Int. Cl.$^6$ ................................................. B01D 53/047
[52] U.S. Cl. ............................ 95/99; 95/101; 95/102; 95/103; 95/105; 95/106; 95/143
[58] Field of Search ..................... 95/96–106, 143, 95/147, 148

[56] References Cited

U.S. PATENT DOCUMENTS

| | | | |
|---|---|---|---|
| 3,085,379 | 4/1963 | Kiyonaga et al. | 95/97 X |
| 3,176,444 | 4/1965 | Kiyonaga et al. | 95/97 X |
| 3,430,418 | 3/1969 | Wagner | 55/25 |
| 3,564,816 | 2/1971 | Batta | 55/26 |
| 3,986,849 | 10/1976 | Fuderer et al. | 55/25 |
| 4,061,724 | 12/1977 | Grose et al. | 423/335 |
| 4,066,423 | 1/1978 | McGill et al. | 95/103 X |
| 4,073,865 | 2/1978 | Flanigen et al. | 423/339 |
| 4,305,734 | 12/1981 | McGill | 95/102 |
| 4,310,440 | 1/1982 | Wilson et al. | 252/435 |
| 4,338,101 | 7/1982 | Tuttle | 55/48 |
| 4,371,380 | 2/1983 | Benkmann | 95/97 |
| 4,421,532 | 12/1983 | Sacchetti et al. | 55/28 |
| 4,440,871 | 4/1984 | Lok et al. | 502/214 |
| 4,567,027 | 1/1986 | Detournay et al. | 423/101 |
| 4,842,621 | 6/1989 | Robbins et al. | 55/26 |
| 4,846,852 | 6/1989 | Schweitzer et al. | 55/31 |
| 4,857,083 | 8/1989 | DiMartino | 95/101 X |
| 4,913,709 | 4/1990 | Kumar | 95/100 |
| 4,915,711 | 4/1990 | Anderson et al. | 95/99 |
| 5,154,735 | 10/1992 | Dinsmore et al. | 55/25 |
| 5,229,089 | 7/1993 | Ramachandran et al. | 423/210 |
| 5,248,322 | 9/1993 | Kumar | 95/101 |
| 5,281,257 | 1/1994 | Harris | 95/147 X |
| 5,415,682 | 5/1995 | Zarchy et al. | 95/101 |

FOREIGN PATENT DOCUMENTS

| | | | |
|---|---|---|---|
| 3200910 | 7/1983 | Germany | 95/104 |
| 52-050979 | 4/1977 | Japan | 95/104 |

OTHER PUBLICATIONS

"Select the Best Control Strategy" by Edward N. Ruddy & Leigh Ann Carroll, Jul. 1993, Chemical Engineering Progress, p. 28.

*Primary Examiner*—Robert Spitzer
*Attorney, Agent, or Firm*—Thomas K. McBride; John G. Tolomei; Richard P. Silverman

[57] ABSTRACT

A process claimed for the removal of VOCs from fluid streams. The process comprises a vacuum swing adsorption zone containing at least 2 adsorption beds wherein the adsorbent beds are cocurrently purged with a diluent stream comprising an inert gas prior to a countercurrent evacuation step. In addition, the adsorbent beds may contain a first adsorption layer comprising an adsorbent selective for the adsorption of the inert gas, whereby the inert gas is retained within the VSA system to prevent the creation of an explosive mixture upon the recovery of the desorbed VOCs.

15 Claims, 1 Drawing Sheet

PROCESS FOR THE REMOVAL OF VOLATILE ORGANIC COMPOUNDS FROM A FLUID STREAM

CROSS-REFERENCE TO RELATED APPLICATIONS

This application is a continuation-in-part of U.S. Ser. No. 151,244, filed Nov. 12, 1993, now U.S. Pat. No. 5,415,682, hereby incorporated by reference.

FIELD OF THE INVENTION

This invention relates to a process for removing volatile organic compounds (VOCs) from a fluid stream. More particularly, this invention relates to the use of a vacuum swing adsorption (VSA) process to remove highly flammable VOCs from a fluid stream with a minimum risk of explosion.

BACKGROUND OF THE INVENTION

The removal of a sorbable component from a gas or vapor stream by flowing such stream through a body of adsorbent material is a fundamental engineering practice. One type of sorbable components which are desirable to remove from a gas stream is volatile organic compounds VOCs.

VOCs are formed in large quantities but at relatively low concentrations from gas turbines, cogeneration plants, petrochemical plants, and in many industrial processes where waste gases contain such materials as vapors of various solvents, inks, paints, and so forth. VOCs contain not only hydrocarbons—saturated, unsaturated, and aromatic—but also contain oxygenated materials such as alcohols, esters, ethers, aldehydes, and acids, nitrogen containing compounds (principally amines), sulfur containing materials (mercaptans and thioethers) and halogen-containing materials, especially chlorine-substituted hydrocarbons but also organic fluorides and bromides. The presence of these VOCs in the gas stream can present a health risk or cause the gas stream to have an unpleasant odor.

The widespread use of solvents in industrial applications has resulted in increased emissions of VOCs into the atmosphere, giving rise to environmental concerns and prompting stricter legislative controls on such emissions. As a consequence, manufacturers of pharmaceuticals, coated products, textiles, and polymer composites and foams, as well as hydrocarbon producers and distributors, face a dilemma in removing VOCs from process gas streams in that, owing to rising energy prices, recovery costs are very often higher than the value of the VOCs recovered, even in light of rising solvent prices. This dilemma has led to inquiries into more profitable methods of removing condensible organic vapors from process gas streams. A recent article titled, "Select the Best VOC Control Strategy," by Edward N. Ruddy and Leigh Ann Carroll which appeared in the July 1993 issue of "Chemical Engineering Progress," page 28–35 summarized current emission control options of thermal oxidation, catalytic oxidation, condensation, carbon adsorption and absorption. In the article, Ruddy and Carroll state that VOCs are among the most common pollutants emitted by the chemical process industries and the reduction of VOCs is, therefore, a major environmental activity.

Conventional adsorption systems for solvent recovery from humid air typically are operated until the solvent concentration in the outlet gas stream reaches a detectable preset breakthrough level whereupon the gas flow to the adsorber is stopped. The adsorbent bed then contains solvent, other condensible organic contaminants, and some amount of water which depends on the inlet relative humidity of the solvent laden gas stream. At this point, present-day techniques involve the introduction of a hot inert gas or steam, either saturated or superheated, which displaces the solvent from the adsorbent to produce a solvent/water mixture upon condensation. Typically two adsorber beds are used, where one is adsorbing while the other bed undergoes regeneration. More recent technology for regenerating and recovering solvent from adsorbent beds involves the use of inert gases (though for some solvents, air also can be used) and low temperature condensation of the solvent from the regenerating gas.

The removal of volatile organic compounds (VOC) from air by adsorption is most often accomplished by thermal swing adsorption (TSA). Air streams needing treatment can be found in most chemical and manufacturing plants, especially those using solvents. At concentration levels from 500 to 15,000 ppm, recovery of VOCs from air is economically justified. Steam is used to thermally regenerate activated carbon adsorbent. Concentrations above 15,000 ppm are typically in the explosive range and require the use of a hot inert gas rather than air for regeneration. Below about 500 ppm, recovery is not economically justifiable, but environmental concerns often dictate adsorptive recovery followed by destruction. Activated carbon is the traditional adsorbent for these applications, which represent the second largest use for gas phase carbons. U.S. Pat. No. 4,421,532 discloses a process for the recovery of VOCs from industrial waste gases by thermal swing adsorption including the use of hot inert gases circulating in a closed cycle to desorb the VOCs.

Pressure swing adsorption (PSA) processes provide an efficient and economical means for separating a multicomponent gas stream containing at least two gases having different adsorption characteristics. The more strongly adsorbed gas can be an impurity which is removed from the less strongly adsorbed gas which is taken off as product, or, the more strongly adsorbed gas can be the desired product which is separated from the less strongly adsorbed gas. For example, it may be desired to remove carbon monoxide and light hydrocarbons from a hydrogen-containing feedstream to product a purified (99+%) hydrogen stream for a hydrocracking or other catalytic process where these impurities could adversely affect the catalyst or the reaction. On the other hand, it may be desired to recover more strongly adsorbed gases, such as ethylene, from a feedstream to produce an ethylene-rich product.

In PSA processes, a multi component gas is typically passed to at least one of a plurality of adsorption zones at an elevated pressure effective to adsorb at least one component, i.e. the more strongly adsorbed components, while at least one other component passes through, i.e. the less strongly adsorbed components. At a defined time, the passing of feedstream to the adsorber is terminated and the adsorption zone is depressurized by one or more cocurrent depressurization steps wherein the pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure in the adsorption zone is further reduced by withdrawing desorbed gas countercurrently to the direction of the feedstream. Finally, the adsorption zone is purged and repressurized. Such PSA processing is disclosed in U.S. Pat. No. 3,430,418, issued to Wagner, U.S. Pat. No. 3,564,816, issued to Batta, and in U.S. Pat. No. 3,986,849, issued to Fuderer et al., wherein cycles based on the use of multi-bed systems are described in detail. As is generally known and described in these patents, the contents of which are incorporated herein by reference as if set out in full, the PSA process is generally carried out in a sequential processing cycle that includes each bed of the PSA system. A VSA process employs a similar sequential processing cycle with the countercurrent depressurization step assisted by a vacuum pump or similar device to evacuate the adsorption zone to reach desorption conditions.

As noted above the more strongly adsorbed components, i.e., the adsorbate, are removed from the adsorber bed by countercurrently depressurizing the adsorber bed to a desorption pressure. In general, lower desorption pressures are preferred in order to provide more complete removal of the adsorbate during the desorption step. U.S. Pat. No. 4,338,101 discloses a process for the recovery of hydrocarbons from inert gas and hydrocarbon mixtures which includes the steps of adsorbing the hydrocarbons in a bed of solid adsorbent and desorbing the hydrocarbons from the bed of adsorbent by evacuating the bed using a vacuum pump. U.S. Pat. Nos. 5,154,735 and 5,229,089 disclose similar processes for recovering hydrocarbons from a hydrocarbon-air mixture employing further vacuum pumping steps to enhance desorption from the solid adsorbents.

U.S. Pat. No. 4,842,621 discloses a process for separating a condensible gas from a non-condensible gas in a vacuum swing adsorption scheme which includes a supercharging step in which a stream relatively rich in the condensible gas is passed through the adsorbent bed following the adsorption step to reduce the amount of condensible gas recycled to the bed in the adsorption step. The supercharging step occurs at a pressure which is higher than the adsorption pressure.

When the impurities are highly volatile or explosive in mixtures with air or other gases, approaches must be employed which avoid the potential safety hazard of fire or explosion should the recovered VOC stream approach a composition in its detonation region. Processes are sought which permit the safe concentration and economic elimination of VOCs from waste gas streams without the further dilution of the waste gas stream with inert gases which raise the capital and operating costs.

SUMMARY OF THE INVENTION

By the present invention, a VSA process is provided for the removal of VOCs from a fluid stream that can yield a vent stream essentially free of VOCs. A concentrated VOC stream may be passed to a separate process for reprocessing and recovery, employed as a fuel, or incinerated. The process employs a selective adsorbent and a diluent. The diluent is an adsorbable inactive gas which is preloaded on the adsorbent and subsequently employed as a copurge gas in a copurge step is thus retained in the process. By retaining the inactive gas in a closed cycle, the formation of an explosive mixture is avoided and a higher separation efficiency is achieved at a lower cost than traditional methods. Gas streams containing condensible and non-condensible VOCs may be processed. When condensible VOCs are present, a liquified stream comprising VOCs will be recovered. When non-condensible VOCs are present, VOCs will remain in a residual gas stream, a portion of which may be withdrawn for further processing, recovered as a fuel, or incinerated. When the VOC is ethylene, the recovered ethylene may be returned to an ethylene plant to be combined with reactor effluent prior to cryogenic separation of the ethylene.

In a broad aspect of the present invention there is provided a vacuum swing adsorption (VSA) process for the recovery and removal of VOCs from a fluid stream comprising VOCs and air. The process includes the steps of passing an adsorbable inactive gas stream to a first adsorption bed of a VSA zone comprising at least two adsorption beds to preload the first adsorption bed with the adsorbable inactive gas and a first adsorption effluent stream is withdrawn. Each of the adsorption beds contains a first adsorbent layer selective for the adsorption of VOCs and a second adsorbent layer selective for the adsorption of the adsorbable inactive gas. The first adsorption bed is countercurrently evacuated to a desorption pressure to provide a tail gas stream comprising the adsorbable inactive gas. The tail gas stream is cooled to provide a residual gas stream, and at least a portion of the residual gas stream is recovered as a product stream. A feedstream is passed to the first adsorption bed at adsorption conditions including an adsorption pressure and an adsorption temperature and a second adsorption effluent stream is recovered. A portion of the residual gas stream is cocurrently passed to the first adsorption bed in a copurge step and a third adsorption effluent is recovered. The third adsorption effluent stream and the second adsorption effluent stream are admixed to provide a treated effluent stream depleted in VOCs relative to the feedstream. The steps of countercurrent evacuation, cooling of the tail gas stream, and adsorption of the VOCs from the feedstream are repeated with each of the adsorbent beds such that a continuous operation of the process is performed.

In another embodiment a vacuum swing adsorption (VSA) process is provided for the separation and recovery of VOCs from a feedstream comprising VOCs and water, and a mixture thereof with air. The VSA process comprises a series of steps. An adsorbable inactive gas stream is passed to a first adsorption bed of a VSA zone comprising at least two adsorption beds to preload the first adsorption bed with nitrogen and a first adsorption effluent stream is withdrawn. Each of the adsorption beds contains a first adsorbent layer and a second adsorbent layer. The first adsorbent layer comprises an adsorbent selective for the adsorption of VOCs and water. The second adsorbent layer comprises an adsorbent selective for the adsorption of nitrogen. The first adsorption bed is countercurrently evacuated to a desorption pressure to provide a first tail gas stream comprising nitrogen. The first tail gas stream is passed to a chiller and a condenser to provide a residual gas stream comprising nitrogen. The feedstream is passed at adsorption conditions, including an adsorption temperature and an adsorption pressure, to the first adsorption bed and a second adsorption effluent stream, depleted in VOCs, is withdrawn. The residual gas stream is cocurrently passed to the first adsorption bed and a third adsorption effluent stream, comprising oxygen, is withdrawn. The third adsorbent effluent stream and the second adsorption effluent stream are admixed to provide a treated adsorption effluent stream having a reduced concentration of VOCs. The first adsorption bed is countercurrently evacuated to a desorption pressure to provide second tail gas stream comprising nitrogen and VOCs. The second tail gas stream is passed to a chiller and a condenser to at least partially condense the water to provide a condensed water stream and the residual gas stream. The steps of adsorption of the feedstream and cocurrently passing the second residual gas stream to the first adsorption bed and admixing the first, and second adsorption stream countercurrent evacuation, and chilling and condensing at least a portion of the water are repeated such that a continuous operation of the VSA process is performed.

DETAILED DESCRIPTION OF THE INVENTION

Figure 1:
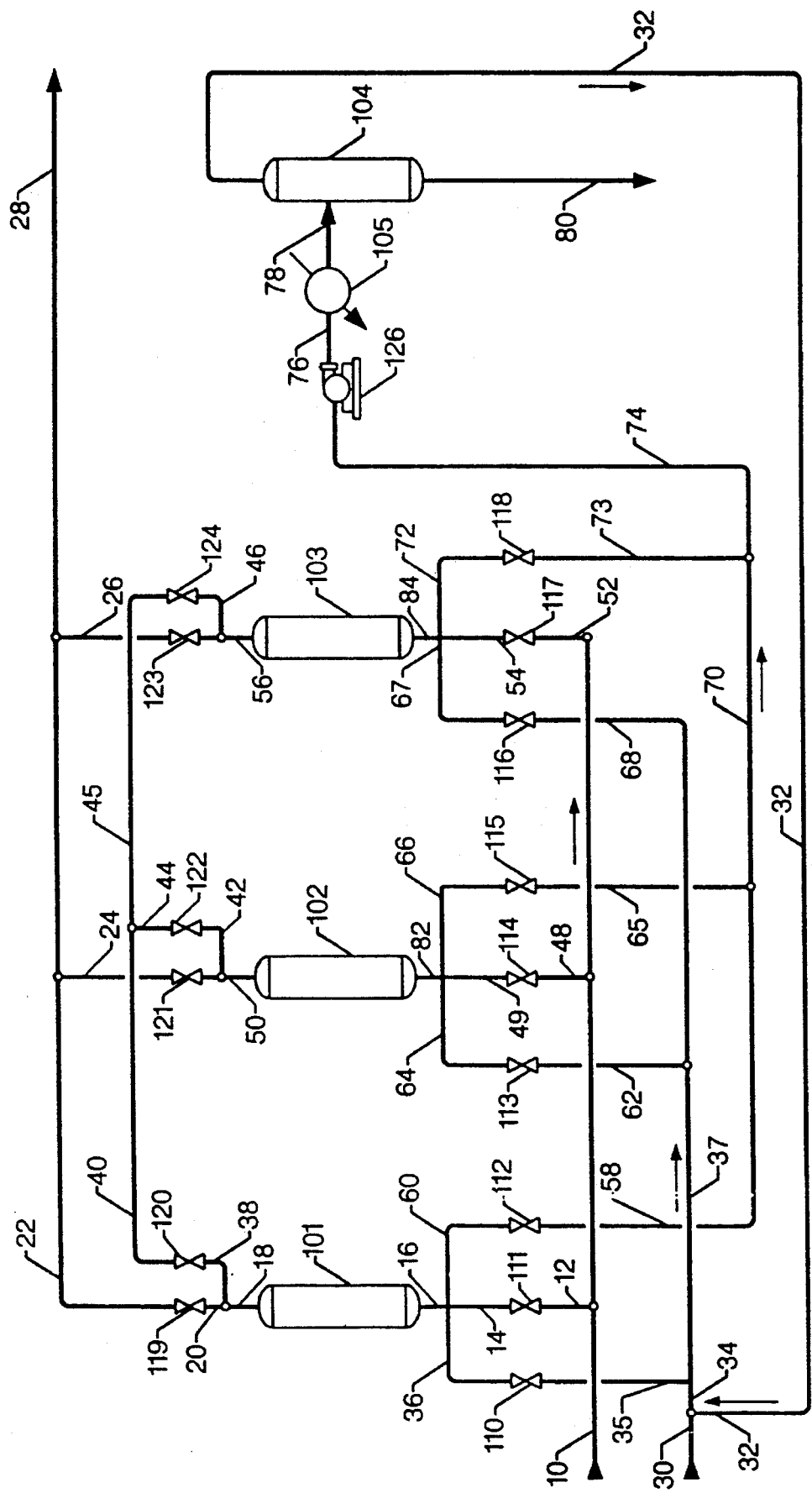
FIG. 1 is a schematic diagram of the process of the invention for the removal of VOCs from a fluid stream.

The pressure swing adsorption process is an essentially adiabatic process for separating a multi-component fluid containing at least one selectively adsorbable component. The PSA process of the invention relates to conventional PSA processing in which each bed of an adsorption zone undergoes, on a cyclic basis, high pressure adsorption, optional cocurrent depressurization to intermediate pressure level(s) with release of void space gas from the product end of the bed, countercurrent depressurization to lower desorption pressure with the release of desorbed gas from the feed end of the bed, with or without purge of the bed, and repressurization to higher adsorption pressure. The process of the present invention adds to this basic cycle sequence the use of a cocurrent copurge step, or copurge step in the adsorption zone in which the less readily adsorbable component is further and preferably essentially completely removed therefrom by the introduction of a copurge gas. The adsorption zone is then countercurrently depressurized to a desorption pressure that is at or below atmospheric pressure with the more adsorbable component(s) comprising VOCs being discharged from the feed end thereof as a product. In the multi-bed adsorption systems to which the invention is directed, the copurge gas used for each bed is obtained by diverting a portion of the gas released from that or another bed in the system during the countercurrent depressurization and purge steps, following recompression, or obtained from an external stream which comprises an adsorbable inactive component. It is preferred that the copurge gas be an external stream for a first cycle and thereafter be a residual gas comprising a non-condensed portion of the gas released from that or another bed in the system during the countercurrent depressurization and purge steps, following recompression and condensation to remove the liquefied VOC product. When the VOCs are non-condensible, the VOCs are recovered in the residual gas stream. The residual gas stream is cooled and a portion of the residual gas stream, depleted in oxygen is returned to the adsorption zone as a copurge gas and a portion of the residual gas comprising the VOCs is withdrawn for use as fuel, for further recovery of the VOCs or incinerated.

The VOCs may be selected from the group consisting of saturated and unsaturated hydrocarbons, oxygenated materials, halogenated materials, and mixtures thereof. The unsaturated hydrocarbons may comprise ethylene or propylene. The oxygenated materials may be selected from the group consisting of alcohols, ethers, esters, aldehydes, ketones and mixtures thereof. The halogenated materials may comprise chlorinated hydrocarbons such as methyl chloride. The VOCs in the residual gas stream may be condensible or non-condensible at conditions following recompression and cooling.

Those skilled in the art will appreciate that the high pressure adsorption step of the PSA process comprises introducing the feedstream to the feed end of the adsorbent bed at a high adsorption pressure. The less readily adsorbable component(s) passes through the bed and is discharged from the effluent end thereof. An adsorption front or fronts are established in the bed with said fronts likewise moving through the bed from the feed end toward the effluent end thereof. When the feedstream contains a less readily adsorbable component and a more readily adsorbable component, a leading adsorption front of the more readily adsorbable component will be established and move through the bed in the direction of the effluent end thereof. In the process of this invention it was discovered that the different components were adsorbed to different degrees. For example, if the most readily adsorbable species were the VOCs, a more readily adsorbable component was nitrogen, and the least readily adsorbable component was oxygen, during the adsorption step, the oxygen would initially become adsorbed on the adsorbent. As the mass transfer front proceeded through the bed, the nitrogen would be co-adsorbed on the adsorbent, displacing a portion of the oxygen.

The feedstream of this invention is generally an industrial waste gas and comprises from about 0.01 to about 20 mol % VOCs, and from about 50 to 99.9 mol % air. The feedstream may comprise water up to saturation conditions.

The feedstream is charged to an adsorption zone to recover VOCs and provide a treated adsorption effluent, depleted in VOCs. In the adsorption zone, the most readily adsorbable component, VOCs, is adsorbed at an adsorption pressure and an adsorption temperature, and the less readily adsorbable components are passed through the adsorption zone and are withdrawn in an adsorption effluent. The adsorption zone pressure ranges from about 100 to about 3450 kPa (about 15 to about 500 psia). The adsorption zone temperature is any temperature effective to adsorb the more readily adsorbable components in the feedstream, and preferably from about $-18°$ C. to about $205°$ C. (about $0°$ to about $400°$ F.). It is to be understood that the adsorption zone of the present invention contains adsorption beds containing adsorbent suitable for adsorbing the particular components to be adsorbed therein. As the capacity of the adsorption bed for the most readily adsorbable component is reached; that is, preferably before a substantial portion of the leading adsorption front has passed through the first adsorption bed, the feedstream is directed to another bed in the adsorption zone. It is to be also understood that the term "countercurrent" denotes that the direction of gas flow through the adsorption zone, i.e., adsorber bed, is countercurrent with respect to the direction of feedstream flow. Similarly, the term "cocurrent" denotes flow in the same direction as the feedstream flow. The purge gas is at least partially comprised of an effluent stream, e.g., the adsorption effluent stream or the copurge effluent stream from the adsorption zone, as hereinafter described, which comprises the less readily adsorbable component. When nitrogen is the less readily adsorbable component, the purge gas is preferably enriched in nitrogen at a higher concentration than available in the feedstream. The term "enriched" is intended to be with reference to the feedstream composition unless otherwise noted. A copurge gas is passed through the bed in a direction cocurrent to the feeding step. By the use of a copurge gas substantially reduced and preferably essentially free of the less readily adsorbable component, thus having a molar concentration of more readily adsorbable components, the less readily adsorbable component that remains in the void spaces of the adsorption bed ahead of the leading adsorption front can be essentially completely displaced from the bed. This enables the most readily adsorbable component to be thereafter discharged from the feed end of the bed as a product by countercurrently depressurizing the bed. The copurge step can be performed in conjunction with one or more cocurrent depressurization steps. When a cocurrent depressurization step is used, it can be performed either before, simultaneously with, or subsequent to the copurge step. The effluent stream from the cocurrent depressurization step, which is comprised primarily of less readily adsorbable components, can be used to partially repressurize or purge another adsorption bed. Preferably, a portion of the adsorption effluent from the latter part of the copurge step is used as the purge feed. At this point in the cycle, the effluent from the copurge step is reduced in oxygen.

After the termination of the copurge step and any desired cocurrent depressurization step(s), the adsorption bed is desorbed by reducing the pressure in a direction countercurrent to the feeding direction to a desorption pressure that is preferably from about 3 kPa (0.5 psia) to about 345 kPa (about 50 psia), and more preferably a desorption pressure that ranges from about 3 kPa (0.5 psia) to about 138 kPa (20 psia). If a purge step is used, the oxygen reduced effluent produced during the latter portion of the copurge step is used to purge the adsorption bed to ensure that the desorption effluent, or tail gas, is non-explosive. Following recompression, a portion of the desorption effluent stream recovered from the adsorption zone could be utilized as copurge gas for the copurge step. Preferably, the desorption effluent, after compression and condensation of VOCs is used as the copurge gas.

A VSA cycle for a 3 bed adsorption zone employing a copurge step is shown in Table 1 below.

TABLE 1

| Bed No. | Cycle | | | | | |
|---|---|---|---|---|---|---|
| 1 | R | A | | C | V | P |
| 2 | V | P | R | A | | C |
| 3 | | C | V | P | R | A |

In the above table, A represents an adsorption step at adsorption pressure and temperature, with the feedstream being introduced to the feed end of an adsorption bed in the adsorption zone and the less readily adsorbable components being discharged from the effluent end thereof. In the present invention the feedstream enters the adsorption bed at the feed end, the VOCs are adsorbed, and a VOC-reduced stream is produced at the effluent end of the adsorption bed. C represents copurge by the introduction of gas essentially free of the less readily adsorbable component to the feed end of the bed so as to further, and preferably essentially completely displace said less readily adsorbable component from the bed. The copurge step may be performed at constant or varying pressure. P represents a purging step at low pressure in the adsorption zone; R represents a repressurization step wherein a process gas such as the feedstream or a portion of the adsorption effluent from the adsorption step or the copurge step is utilized to repressurize the adsorber bed to the adsorption pressure. V represents a vacuum or evacuation step wherein the pressure of the adsorption bed is reduced to the desorption pressure with a vacuum pump or similar device. A desorption effluent or tail gas comprising the most readily adsorbable and the more readily adsorbable components is withdrawn during this step. It will be understood that in addition to the three-bed configuration illustrated above for the adsorption zone, other configurations, i.e., 2, 4, 5 or more beds, can be employed and are intended to be within the scope of the present invention.

The copurge step may also occur following a cocurrently depressurizing step and prior to a further cocurrently depressurizing step. In the copurge step, a second feed or copurge gas is cocurrently passed to the adsorption zone forcing additional unadsorbed material from the adsorption zone. The copurge gas must have a concentration of the more readily adsorbable components which is greater than the concentration of the more readily adsorbable component in the first feed. Typically, this additional unadsorbed material withdrawn in the copurge step is combined with the effluent from the adsorption step. The effluent withdrawn from the adsorbent bed during the copurge step, is initially VOC-free air. During the latter part of the copurge step, the effluent withdrawn from the adsorbent bed is oxygen-lean. This oxygen-lean effluent may be used as a purge gas.

It will be further understood that various changes and modifications can be made in the details of the VSA process with intermediate product recovery as herein described and illustrated above without departing from the scope of the invention as set forth in the appended claims. Accordingly, the individual steps described, as well as conventional variations thereof are generally known by those skilled in the art and need not be further described herein. It will be further understood that VSA systems necessarily incorporate various conduits, valves, and other control features to accomplish the necessary switching of adsorbent beds from one step to the next, in appropriate sequence as in conventional VSA operations.

It will also be understood that the invention can be carried out using any suitable adsorbent material in the adsorption zone having a selectivity for various components of a feedstream over other such components, thereby providing a less readily adsorbable component and a more readily adsorbable component. Suitable adsorbents known in the art and commercially available include crystalline molecular sieves, activated carbons, activated clays, silica gels, activated aluminas and the like. Such adsorbent material or mixtures thereof will be understood to be suitable if the adsorbent material is capable of selectively adsorbing impurities such as VOCs and water from a fluid stream. The molecular sieves include, for example, the various forms of silicoaluminophosphates, and aluminophosphates disclosed in U.S. Pat. Nos. 4,440,871; 4,310,440 and 4,567,029, hereby incorporated by reference as well as zeolitic molecular sieves.

As used here, the term "molecular sieve" is defined as a class of adsorptive desiccants which are highly crystalline in nature, distinct from amorphous materials such as gamma-alumina. Preferred types of molecular sieves within this class of crystalline adsorbents are aluminosilicate materials commonly known as zeolites. The term "zeolite" in general refers to a group of naturally occurring and synthetic hydrated metal aluminosilicates, many of which are crystalline in structure. There are, however, significant differences between the various synthetic and natural materials in chemical composition, crystal structure and physical properties such as x-ray powder diffraction patterns. The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Å units, whereas calcium zeolite A has an apparent pore size of about 5 Å units. The term "apparent pore size" as used herein may be defined as the maximum critical dimension of the molecular sieve in question under normal conditions. The apparent pore size will always be larger than the effective pore diameter, which may be defined as the free diameter of the appropriate silicate ring in the zeolite structure.

Zeolitic molecular sieves in the calcined form may be represented by the general formula;

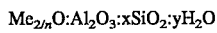

$$Me_{2/n}O:Al_2O_3:xSiO_2:yH_2O$$

where Me is a cation, x has a value from about 2 to infinity, n is the cation valence and y has a value of from about 2 to 10. Typical well-known zeolites which may be used include chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicate disclosed in U.S. Pat. No. 4,073,865, hereby incorporated by reference. Detailed descriptions of some of the above-identified zeolites may be found in D. W. Breck, *Zeolite Molecular Sieves*, John Wiley and Sons, New York, 1974, hereby incorporated by reference.

The general formula for a molecular sieve composition known commercially as type 13X is:

$$1.0\pm0.2Na_2O:1.00Al_2O_3:2.5\pm0.5SiO_2$$

plus water of hydration. Type 13X has a cubic crystal structure which is characterized by a three-dimensional network with mutually connected intracrystalline voids accessible through pore openings which will admit molecules with critical dimensions up to 10 Å. The void volume is 51 volume percent of the zeolite and most adsorption takes place in the crystalline voids.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silicaaluminas, silica-zirconias, silica-thorias, silica-berylias, silica-titanias, silica-alumina-thorias, silica-alumina-zirconias, mixtures of these and the like, clay-type binders are preferred. Examples of clays which may be employed to agglomerate the molecular sieve without substantially altering the adsorptive properties of the zeolite are attapulgite, kaolin, volclay, sepiolite, palygorskite, kaolinite, bentonite, montmorillonite, illite and chlorite. The choice of a suitable binder and methods employed to agglomerate the molecular sieves are generally known to those skilled in the art and need not be further described herein.

The process of this invention is illustrated in FIG. 1. FIG. 1 is a schematic flow sheet of a vacuum swing adsorption process for the removal of VOCs and water from a mixture thereof with air according to the instant invention. With reference to FIG. 1, the three adsorption beds 101, 102, and 103 are loaded with a silica gel adsorbent and arranged in parallel between feedstream manifold 10 and effluent manifold 28. The full cycle will be described for adsorption bed 101 and is typical for all adsorption beds. Assume adsorption bed 101 is pressurized with air, although the adsorption beds may be pressurized with nitrogen, and that all its associated valves are initially closed. Pressures and times are illustrative. Valve 110 opens and an initial charge of an adsorbable inactive gas stream in line 30 such as nitrogen, argon, carbon monoxide, methane, or carbon dioxide is cocurrently passed to adsorption bed 101 at adsorption conditions including an adsorption pressure and an adsorption temperature via lines 30, 34, 35, valve 110, line 36 and line 16. An adsorption effluent, comprising oxygen is withdrawn from the adsorption zone via line 20, valve 119 and passed to the effluent header 28 via line 22. Flow continues until the adsorbable inactive gas stream has displaced oxygen from the adsorption bed. Now valves 110 and 119 close and valve 112 opens, thereby establishing the beginning of the countercurrent evacuation step to the desorption pressure which is established by vacuum pump 126. The desorption effluent, or tail gas stream, which is oxygen-lean and therefore non-explosive, is passed to the vacuum pump via lines 16 and 60, valve 112, line 58, line 70 and line 74. From the vacuum pump, the tail gas stream is passed via line 76 to chiller 105 where the temperature of the tail gas is reduced to condense at least a portion of the water and passed to condenser 104 via line 78 wherein the vapor and liquid phases are separated to provide a residual gas stream which is depleted in oxygen relative to the feedstream in line 32 and a condensed water stream in line 80 which is recovered. Following the evacuation step, valves 120 and 122 open to begin the purge step. As the desorption effluent is passed to the vacuum pump, a portion of an oxygen-free, VOC-free, second adsorption effluent is permitted to flow as a purge gas from adsorption bed 102 which is nearing the completion of its copurge step. This purge gas flows from adsorption bed 102 via lines 50 and 42, valve 122, lines 44 and 40, valve 120 and lines 38 and 18. At the conclusion of the purge step, the adsorption bed 101 undergoes repressurization. Valves 120 and 112 close and valve 111 opens allowing the feedstream from the feed header 10 to be passed through line 12, valve 111 and lines 14 and 16 to the adsorption bed 101. When the pressure in adsorption bed 101 reaches the adsorption pressure, valve 119 opens and the adsorption step begins. During the adsorption step, the feedstream continues to be passed to adsorption bed 101, but now a first adsorption effluent is withdrawn from the adsorption bed to the effluent header 28 via lines 18 and 20, valve 119 and line 22.

At the conclusion of the adsorption step, adsorption bed 101 undergoes a copurge step, wherein valve 111 is closed and valve 110 opens, allowing a portion of the residual gas in line 32 to be passed to the adsorption bed 101 via lines 34 and 35, valve 110 and lines 36 and 16. During this copurge step a second adsorption effluent is passed via lines 18 and 20, valve 119, and line 22 to the effluent header.

The other adsorption beds are operated in a similar fashion according to the cycle shown in Table 1. For adsorption bed 102, during the adsorption step, the feedstream is passed to adsorption bed 102 via lines 10 and 48, valve 114 and lines 49 and 82. Similarly, for adsorption bed 103, during the adsorption step, the feedstream is passed to adsorption bed 103 via lines 10 and 52, valve 117 and lines 54 and 84. The first adsorption effluent is withdrawn from adsorption bed 102 via line 50, valve 121, and line 24 to reach the effluent header 28. Similarly, for adsorption bed 103 in the adsorption step, the feedstream is passed from the feed header 10 to line 52, valve 117, line 57, and line 84, while the first adsorption effluent is passed to the effluent header 28, via line 56, valve 123, and line 26. During the copurge step, the residual gas stream is passed to adsorption bed 102 via line 34, line 37, line 62, valve 113, line 64, and line 82. Similarly, for adsorption bed 103, the copurge gas stream is passed to adsorption bed 103 via line 34, line 37, line 68, valve 116, line 67, and line 84. During the evacuation step for adsorption bed 102, the desorption effluent is withdrawn via line 82, line 66, valve 115, line 65, line 70 and line 74 to reach the vacuum pump 126. Toward the end of the evacuation step, purge gas from adsorption bed 103 is passed via line 56, line 46 valve 124, line 45, line 44, valve 122, line 42, and line 50. Similarly, for adsorption bed 103 during the evacuation step, the desorption effluent is withdrawn via line 84, line 72, valve 118, line 73 and line 74 to reach the vacuum pump 126. During the purge step, purge gas from adsorption bed 101 is passed to adsorption bed 103 via line 18, line 38, valve 120, line 40, line 45, valve 124, line 46 and line 56.

Adsorption beds 102 and 103 may be initially preloaded with nitrogen or an inactive gas from line 30 in turn in the same fashion as adsorption bed 101, prior to the introduction of the feedstream. Under normal operation, the initial preloading of the first adsorption bed with inactive gas is sufficient to sweep the oxygen from the adsorption beds during the copurge step to maintain a closed cycle of the inactive gas. Should the feedstream composition be sufficiently lean with respect to the inactive gas, a second adsorbent layer, containing an adsorbent such as zeolite X, zeolite Y, silicates, high silica zeolites and mixtures thereof, selective for the adsorption of the inactive gas may be placed downstream of a first adsorbent layer, wherein the first adsorbent layer is selective for the adsorption of VOCs. The first and the second adsorbent layers may be located in the same adsorption bed. Thus, the adsorbent in the second adsorbent layer acts to retain the inactive gas within the adsorption bed in a closed cycle in order to prevent the formation of an explosive mixture of VOCs in the tail gas stream or in the residual gas stream. In this configuration, the process may be operated for several cycles as an air separator to provide the adsorbable inactive gas stream. Air is passed to the process without introducing the feedstream until the residual gas stream is depleted in oxygen. At that point, the preloading of inactive gas will be complete and the feedstream introduced to the adsorption bed.

By employing the copurge step in the PSA zone to displace the adsorbed oxygen with an adsorbable inactive gas, the composition of the VOC-rich, tail gas stream will remain below the lower explosive limit of the VOCs in the tail gas stream. In starting up the process, the copurge gas may be supplied as an initial charge from an outside source of say, nitrogen. Following this initial charge, the mount of nitrogen returned in the residual gas should be sufficient to displace the oxygen in the adsorption bed and to maintain the tail gas below the lower explosive limit. Preferably, for most feedstream compositions, the initial displacement gas charge will range from about 1 to about 20 percent of the feed rate per cycle, and more preferably the initial displacement gas charge will range between about 8 to about 20 percent of the feed rate per cycle. Since the external inactive gas stream in line 30 is used as the copurge gas for the first cycle, the residual gas in line 32 may be vented to the atmosphere or admixed with the feedstream during the first copurge step. Following the first cycle, the residual gas stream in line 32 is employed as the copurge gas, the residual gas being reduced in oxygen.

The invention will be further clarified by a consideration of the following examples, which are intended to be purely exemplary of the use of the invention. These examples are based on engineering design calculations.

EXAMPLES

Example I

A feed gas mixture representing an air-VOC mixture containing 79% nitrogen, 20.8% oxygen and 0.2% xylene was treated in a typical 3-bed vacuum swing adsorption (VSA) process. Each of the adsorption beds contained silica gel adsorbent. The feed gas was charged to the adsorption beds at a temperature of about 32° C. (90° F.) and a pressure of 138 kPa (20 psia) in the amount of 1,000 pound-moles per hour. Under conventional VSA processing, the adsorption step producing a treated adsorption effluent gas, depleted in VOCs, was followed by depressurization and/or evacuation steps to reduce the pressure in the adsorption bed to desorption conditions, producing a VOC-rich tail gas stream. The VSA recovered about 90% of the air per cycle. Upon the cooling and condensation of the tail gas stream, a residual gas stream and a condensed VOC stream were produced. The average composition of the VOC-rich gas stream, or tail gas stream, desorbed from the adsorbent and the residual gas stream following condensation of VOCs is shown in Table 2. This residual gas stream is either recombined with the feed gas or used as a copurge gas following during the adsorption step. Unfortunately, the composition of the VOC-rich gas stream having 20% $O_2$ and 2% xylene is within the explosive range, and therefore this operation is not viable, despite its ability to produce treated adsorption effluent gas significantly depleted of VOCs relative to the feed gas stream, containing less than about 10 ppm-mol of xylene. The lower and upper explosive limits (LEL and UEL) for xylene air is 1 and 7 vol %, respectively.

Example II

In Example II, the feed gas of Example I was charged to a VSA process similar to Example I, based on an air recovery reduced from that of Example I to about 70% so that the VOC-rich gas is not explosive. The lower efficiency requires the operation at a higher desorption pressure of about 34 kPa (5 psia) compared to the desorption pressure of about 14 kPa (2 psia) in Example I. In Example II, the VOC-rich gas and the residual gas flow rates were 4 times greater than those of Example I. Therefore, this Example II operation at 70% air recovery per cycle required a larger vacuum pump than Example I and a condenser 2 times larger than Example I. The vacuum pump of Example II required over 2 times the power of Example I to achieve the same separation. The VOC-rich gas produced in Example II is not explosive because the VOC concentration is less than the lower explosive limit (LEL), which is 1.0 mol-% xylene in air.

Example III

The feed gas mixture of Example I was charged to the process of the present invention. As in Example I, the adsorbent was silica gel and the VSA zone contained 3 adsorption beds. Nitrogen and in the amount ranging from about 8 to about 20 percent of the feed rate was employed to initially copurge the first adsorption bed to preload the adsorbent bed and to provide a sufficient amount of nitrogen to the system to prevent the formation of an explosive mixture on desorption of the adsorption bed. The results of this operation are shown in the table. Surprisingly, the oxygen content of the VOC-rich gas was reduced dramatically to about 1.0%, while the VSA system operated at about a 90% recovery of air per cycle. Thus, the preloading of the adsorption bed with nitrogen during the first cycle and the closed cycle operation maintained the VOC-rich gas stream and the residual gas stream outside explosive limits. Furthermore, the amount of residual gas in Example III was returned to the level of Example I with a correspondingly lower power requirement for the vacuum pump over Example II.

this Example, only a portion of the water condensed at the temperature of the condenser which ranged from about 15° C. (60° F.) to about 27° C. (80° F.). The results of Example IV are shown in Table 3. The adsorption effluent, or treated feed gas, contained less than 10 ppm-mol ethylene. The VOCs, as shown by the ethylene composition, remained in the residual gas stream. The oxygen content of the residual gas stream was about 1%, well below the explosive limit and permitting at least a portion of the residual gas stream to be employed as the nitrogen-rich copurge stream and a portion

TABLE 2

COMPARISON OF VSA OPERATION FOR VOC RECOVERY

|  | Example I | | Example II | | Example III | |
|---|---|---|---|---|---|---|
|  | VOC-rich Gas | Residual Gas | VOC-rich Gas | Residual Gas | VOC rich Gas | Residual Gas |
| P, PSIA | 2–20 | 20 | 5–20 | 20 | 2–20 | 20 |
| T, °F. | 80 | 40 | 80 | 40 | 80 | 40 |
| F, lb Moles Hr | 113 | 111 | 430 | 428 | 113 | 111 |
| Composition, (Mol-%) | | | | | | |
| N₂ | 77.5 | 79.0 | 78.7 | 79 | 97.0 | 98.8 |
| O₂ | 20.5 | 20.8 | 20.6 | 20.8 | 1.0 | 1.0 |
| Xylene | 2.0* | 0.2 | 0.7 | 0.2 | 2.0 | 0.2 |
| Vacuum pump, BHP | 185 | | 440 | | 185 | |

*Explosive Mixture

Example IV

A feed gas mixture comprising air and a VOC containing 76.1 vol % nitrogen, 20.2 vol % oxygen, 3.6 vol % water and about 500 ppm-vol ethylene, a non-condensible VOC, was treated in a typical 3-bed vacuum swing adsorption (VSA) process. Each adsorption bed had a feed end and an effluent end. Each of the adsorption bed contained a first layer of silica gel adsorbent and a second layer of a nitrogen selective adsorbent, zeolite 13X. The layer of the nitrogen selective adsorbent was located at the effluent end, typically the top, of each adsorption bed. As in Example III, a stream of nitrogen was employed to initially preload the adsorption beds with nitrogen and to provide a sufficient amount of nitrogen in the 3-adsorption bed system to prevent the formation of an explosive mixture of air and the VOCs. In to be withdrawn as a product, comprising the VOC. The product portion of the residual gas stream, now containing a concentrated amount of ethylene, can be returned to an ethylene production process for further recovery of the ethylene from the nitrogen, or recovered for incineration or fuel use. The recovered residual gas stream contained about 0.4 wt-% ethylene.

TABLE 3

CONCENTRATION OF STREAMS WITH NON-CONDENSIBLE VOCs

|  | Feed Gas | Adsorption Effluent | Condensate | Residual Gas |
|---|---|---|---|---|
| Pressure, kPa | 172 | 103 | 103 | 158 |
| Composition, Mol % | | | | |
| Nitrogen | 76.1 | 76.4 | | 94.5 |
| Oxygen | 20.2 | 23.6 | | 1.0 |
| Ethylene, ppm | 500 | 10 | | 4440 |
| Water | 3.6 | | 100 | 4.0 |

Example V

A feed gas mixture containing air, ethylene, and water was charged to a 3-bed VSA process to produce a vent stream containing less than about 10 ppm-mole ethylene as in Example IV. The composition of the feed gas mixture was 76.1 mol % nitrogen, 20.2 mol % oxygen, 3.6 mol % water and 1000 ppm-mol ethylene. The feed gas was saturated with water at about 37° C. and about 193 kPa. The residual gas stream produced upon desorption, cooling, and condensation of water contained about 1 mol-% oxygen, 94.1 mol % nitrogen, 4. mol-% water, and about 8900 ppm-mol ethylene. A portion of the residual gas stream, equal to about 30 vol % of the feed gas mixture, was recycled to the VSA unit as a copurge gas. The remaining portion of the residual gas stream was returned to an ethylene plant prior to the low temperature recovery section for the recovery of the ethylene.

We claim:

1. A vacuum swing adsorption (VSA) process for the separation and recovery of VOCs from a feedstream comprising VOCs and mixtures thereof with air, said process comprising the following steps:
   a) passing an adsorbable inactive gas stream to a first adsorption bed of a VSA zone comprising at least two adsorption beds each of said adsorption beds containing a first adsorbent layer selective for the adsorption of said VOCs and a second adsorbent layer selective for the adsorption of said VOCs and the adsorbable inactive gas to preload said first adsorption bed with said adsorbable inactive gas and withdrawing a first adsorption effluent stream;
   b) countercurrently evacuating said first adsorption bed to a desorption pressure to provide a tail gas stream comprising said adsorbable inactive gas;
   c) cooling said tail gas stream to provide a residual gas stream, and recovering at least a portion of said residual gas stream as a product stream;
   d) passing said feedstream to said first adsorption bed at adsorption conditions including an adsorption pressure and an adsorption temperature and recovering a second adsorption effluent stream;
   e) cocurrently passing a portion of said residual gas stream in a copurge step to said first adsorption bed and producing a third adsorption effluent stream;
   f) admixing said third adsorption effluent stream and said second adsorption effluent stream to provide a treated adsorption effluent stream depleted in VOCs relative to the feedstream; and
   g) repeating steps (d) through (f) and (b) and (c) with each of said adsorption beds such that a continuous operation of the process is performed.

2. The process of claim 1 wherein said VOCs are selected from the group consisting of saturated and unsaturated hydrocarbons, oxygenated materials, halogenated materials and mixtures thereof.

3. The process of claim 2 wherein said unsaturated hydrocarbons comprise ethylene or propylene.

4. The process of claim 2 wherein said oxygenated materials are selected from the group consisting of alcohols, ethers, esters, aldehydes, ketones, and mixtures thereof.

5. The process of claim 2 wherein said halogenated materials comprise chlorinated hydrocarbons.

6. The process of claim 1 wherein the portion of said residual gas cocurrently passed to the first adsorption bed in the copurge step ranges from about 20 to about 90 percent of said residual gas stream.

7. The process of claim 1 further comprising passing the at least a portion of said residual gas stream to a process for the further separation of said VOCs.

8. The process of claim 1 further comprising passing the at least a portion of said residual gas stream to fuel or to an incinerator.

9. The process of claim 1 wherein the adsorbable inactive gas stream contains an adsorbable inactive component selected from the group consisting of nitrogen, carbon dioxide, carbon monoxide, argon, methane, and mixtures thereof.

10. The process of claim 1, wherein the adsorbable inactive gas stream comprises nitrogen.

11. The process of claim 1 wherein said first adsorbent layer contains an adsorbent selected from the group consisting of aluminas, silica gel, activated alumina, activated carbon, molecular sieves, and mixtures thereof.

12. The process of claim 1 wherein said second adsorbent layer is selected from the group consisting of zeolite X, zeolite Y, silicalites and mixtures thereof.

13. The process of claim 12 wherein said second adsorbent layer comprises zeolite 13X.

14. A vacuum swing adsorption (VSA) process for the separation and recovery of VOCs from a feedstream comprising VOCs and water, and a mixture thereof with air, said VSA process comprising the following steps:
   a) passing a gas stream comprising nitrogen to a first adsorption bed of a VSA zone comprising at least two adsorption beds, each of said adsorption beds containing a first adsorbent layer and a second adsorbent layer, said first adsorbent layer comprising an adsorbent selective for the adsorption of VOCs and water, said second adsorbent layer comprising an adsorbent selective for the adsorption of nitrogen, to preload said first adsorbent bed with nitrogen and withdrawing a first adsorption effluent;
   b) countercurrently evacuating said first adsorption bed to a desorption pressure to provide a first tail gas stream comprising nitrogen;
   c) passing said first tail gas stream comprising nitrogen to a chiller and a condenser to provide a residual gas stream;
   d) passing said feedstream at adsorption conditions including an adsorption temperature and an adsorption pressure to said first adsorption bed and withdrawing a second adsorption effluent stream depleted in VOCs;
   e) cocurrently passing a portion of said residual gas stream to said first adsorption bed and withdrawing a third adsorption effluent comprising oxygen;
   f) admixing said third adsorbent effluent stream and said second adsorption effluent stream to provide a treated adsorption effluent stream having a reduced concentration of VOCs;
   g) countercurrently evacuating said first adsorption bed to a desorption pressure to provide a second tail gas stream comprising nitrogen, water, and VOCs;
   h) passing said second tail gas stream to a chiller and a condenser to at least partially condense the water to provide a condensed water stream and the residual gas stream; and
   repeating steps (d) through step (h) such that a continuous operation of said process is performed.

15. The process of claim 14 wherein the VOCs are selected from the group consisting of methyl chloride, ethylene, propylene, acetaldehyde, and mixtures thereof.

* * * * *